(12) United States Patent
Sobolik

(10) Patent No.: US 7,669,784 B2
(45) Date of Patent: Mar. 2, 2010

(54) AGRICULTURAL SPRAYER IMPLEMENT

(75) Inventor: David J. Sobolik, Devils Lake, ND (US)

(73) Assignee: Summers Manufacturing Co., Inc., Maddock, ND (US)

(*) Notice: Subject to any disclaimer, the term of this patent is extended or adjusted under 35 U.S.C. 154(b) by 319 days.

(21) Appl. No.: 11/375,490

(22) Filed: Mar. 14, 2006

(65) Prior Publication Data

US 2007/0215719 A1    Sep. 20, 2007

(51) Int. Cl.
  B05B 1/20    (2006.01)
  B05B 3/02    (2006.01)
  B05B 3/14    (2006.01)
  A01G 25/09   (2006.01)
  E01C 19/16   (2006.01)
  E01H 3/02    (2006.01)

(52) U.S. Cl. ............... 239/161; 239/159; 239/166; 239/168; 239/172

(58) Field of Classification Search ............... 239/159, 239/160, 161, 162, 166, 167, 168, 170, 722, 239/723, 726, 728, 729, 730, 732, 734, 739, 239/740, 741, 743, 754, 172
See application file for complete search history.

(56) References Cited

U.S. PATENT DOCUMENTS

| | | | |
|---|---|---|---|
| 3,395,503 A * | 8/1968 | Grenburg et al. ............... 52/114 |
| 3,562,994 A | 2/1971 | Linsowe | |
| 4,288,034 A * | 9/1981 | Widmer et al. ............... 239/168 |
| 4,379,522 A | 4/1983 | Elliott et al. | |
| 4,735,365 A | 4/1988 | Smeller et al. | |
| 5,176,322 A * | 1/1993 | Sartor ........................ 239/77 |
| 5,988,528 A * | 11/1999 | Krohn et al. ................. 239/168 |
| 6,053,419 A * | 4/2000 | Krohn et al. ................... 239/1 |
| 6,293,475 B1 * | 9/2001 | Sobolik ...................... 239/168 |
| 6,422,483 B1 | 7/2002 | Yocom et al. | |
| 6,837,446 B1 | 1/2005 | Jesse | |
| 2003/0052188 A1 | 3/2003 | Maliteare | |
| 2004/0238659 A1 | 12/2004 | Wubben et al. | |

* cited by examiner

Primary Examiner—Dinh Q Nguyen
Assistant Examiner—Ryan Reis
(74) Attorney, Agent, or Firm—Hamre, Schumann, Mueller & Larson, P.C.

(57) ABSTRACT

An agricultural sprayer implement which includes a wheeled main body and a cantilevered boom. The cantilevered boom has a plurality of sections which fold with respect to one another and place significant torsional stress on one or more of the boom sections. The interior boom sections have a cylindrical tube as a lower member and preferably a square tube as an upper member with a plurality of braces extending between them. The cylindrical tube resists the torsional stress which is maximized during folding of the boom. The square tube resists particularly an upward/downward bending moment.

20 Claims, 5 Drawing Sheets

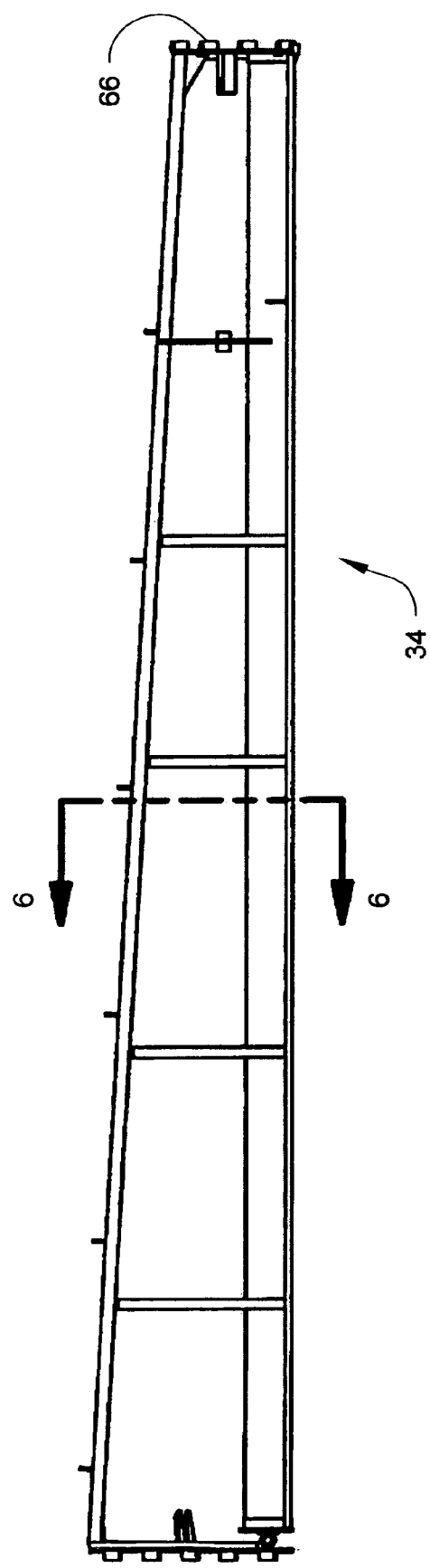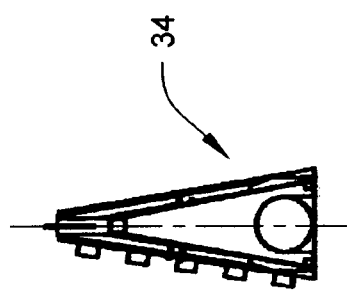
Fig. 5
Fig. 6 ary sprayer, to a farm sprayer implement having a
AGRICULTURAL SPRAYER IMPLEMENT

FIELD OF THE INVENTION

The present invention is directed to an agricultural sprayer, and more particularly, to a farm sprayer implement having a boom with the combination of a larger cylindrical tube as a lower member and a smaller square tube as an upper member tied together by braces forming the main structure of the boom.

BACKGROUND OF THE INVENTION

Conventional booms for agricultural sprayer implements are typically truss-like in structure. That is, the boom has three or more stringer or structural members extending the length of a section of the boom. The stringers are tied together by various angles, braces and/or other structure. Such three dimensional truss-like booms have height and depth and are commonly heavy so as to provide sufficient strength for up/down movement and forward/backward movement. A heavy boom implies that the entire implement is heavier as it crosses a field and can, therefore, create deeper ruts, as well as take more fuel. There is greater chance to damage young crops.

Thus, there is a need to simplify boom structure for the big-long booms of agricultural sprayer implements.

SUMMARY OF THE INVENTION

The agricultural sprayer implement of the present invention includes a wheeled main body with a cantilevered boom attached to and extending away from the wheeled main body. The cantilevered boom includes a plurality of sections which fold with respect to one another. At least some of the plurality of sections consist essentially of a cylindrical tube as the lower first member of structure of the boom section and a square tube as the structural upper second member of the boom section. Braces extend between the upper and lower members. The greatest width of the square tube of the upper member is less than the outside diameter of the cylindrical tube of the first member.

Boom sections in accordance with the invention provide torsional stability with the cylindrical tube and resistance to bending in an up/down direction or a forward/reverse direction with the square tube. The braces tie the upper and lower members together and provide additional structure and strength.

The boom sections in accordance with the present invention form substantially a plane. That is, the centerlines of the cylindrical tube, the square tube, and the various braces are all aligned. The plane is substantially perpendicular to the ground.

The boom of this invention is relatively simple and easy to manufacture. Furthermore, it is lighter than conventional booms so that boom weight adds less weight to the agricultural sprayer implement.

BRIEF DESCRIPTION OF THE DRAWINGS

FIG. 5 is a front plan view of a boom section adjacent to the boom section of FIG. 3;

FIG. 6 is a cross-sectional view taking long line 6-6 of FIG. 5; and

DETAILED DESCRIPTION

Figure 1:
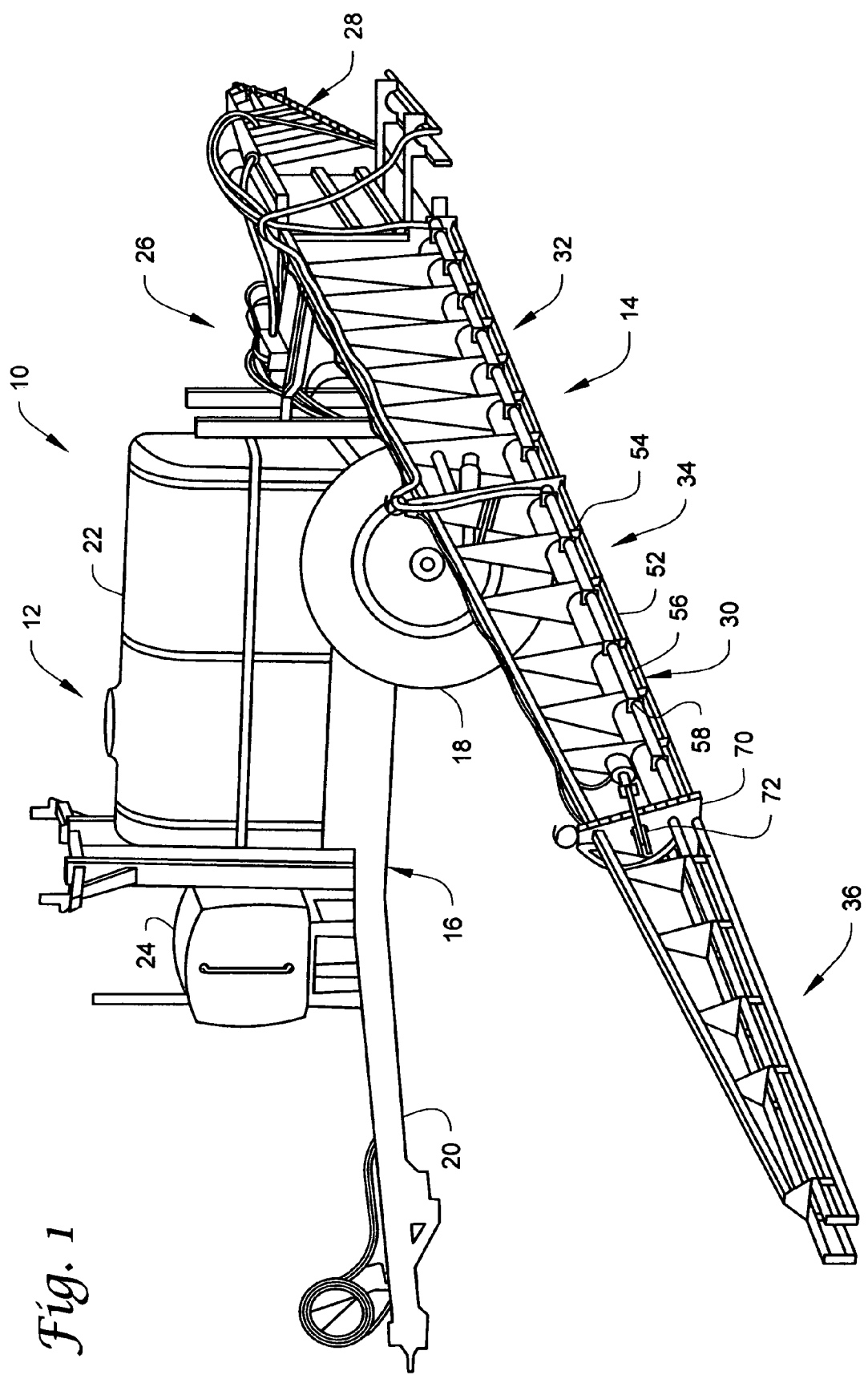
FIG. 1 is a perspective view of an agricultural sprayer implement in accordance with the present invention.

The present invention is described in detail in the accompanying drawings wherein like numerals designate the same part throughout the various views. With reference to FIG. 1, the agricultural sprayer implement of the present invention is designated generally by the numeral 10. Implement 10 includes a wheeled main body 12 with an attached cantilevered boom attached to and extending away from the wheeled main body 12.

Main body 12 includes a frame 16 having wheels 18 at a rear end and a hitch 20 at a forward end. Frame 16 supports a chemical tank 22 and a rinse tank 24. The elements thus far described with respect to main body 12 of implement 10 are not the subject matter of the present invention, although it is understood that the present invention includes a wheeled main body to form an agricultural sprayer implement.

The embodiment of the present invention as shown in the drawings includes boom 14 attached to wheeled main body 12. Boom 14 includes a right boom 28 and a left boom 30. Since the left and right booms are constructed similarly, only one of them is described hereafter.

Figure 2:
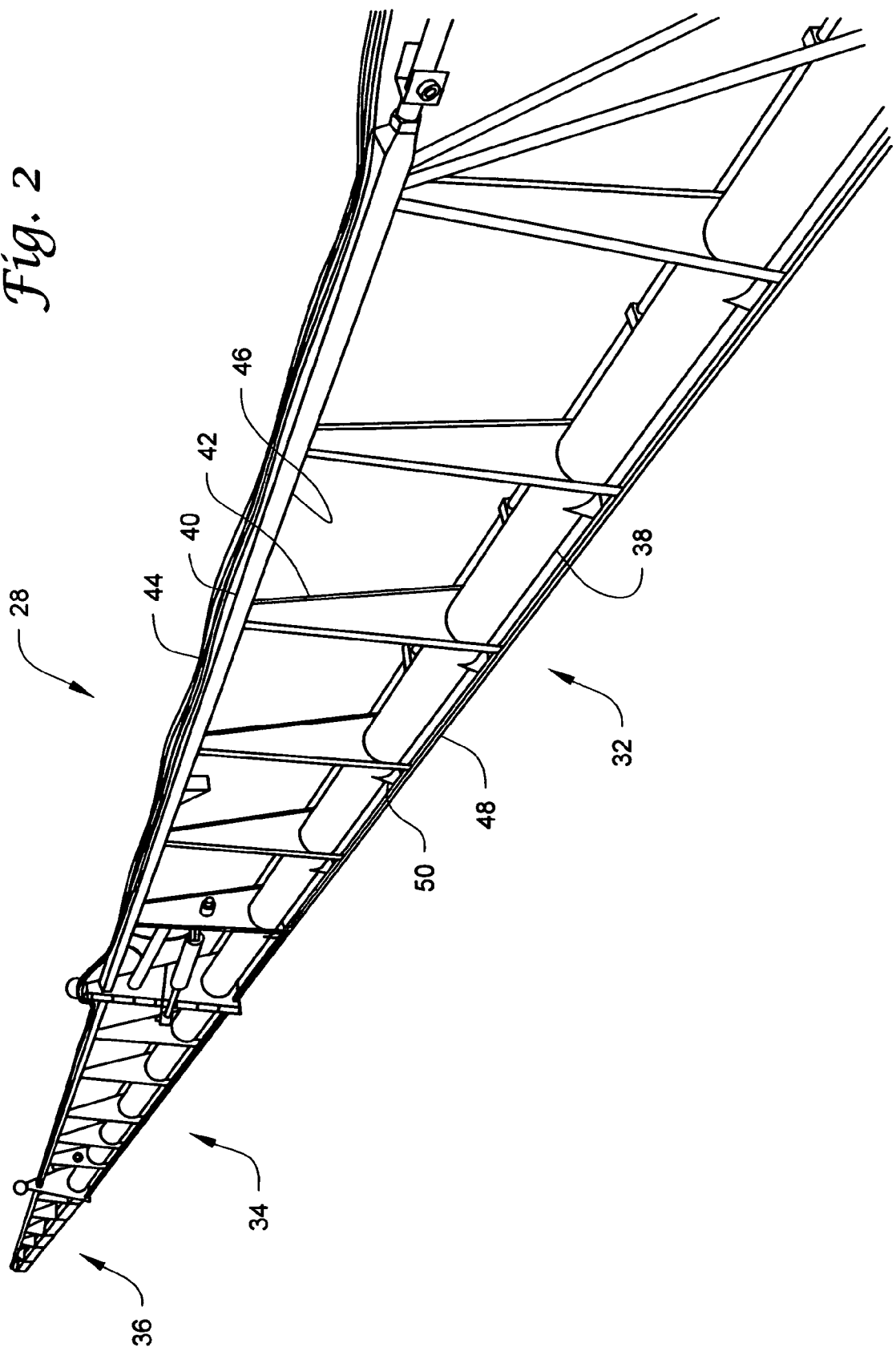
FIG. 2 is a perspective view from the front right of a boom in accordance with the present invention.
Figure 3:
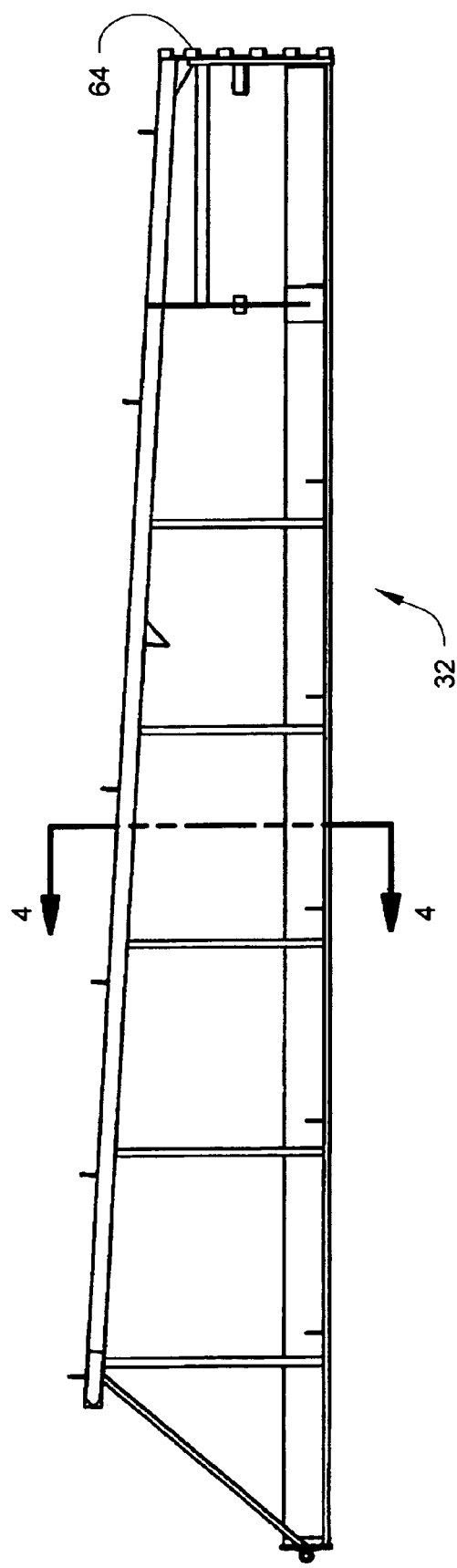
FIG. 3 is a front plan view of a boom section nearest the main body.
Figure 4:
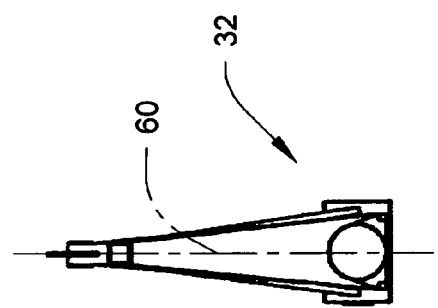
FIG. 4 is a cross-sectional view taking long line 4-4 of FIG. 3.

With reference to FIG. 2, boom 28 has first, second, and third sections 32, 34, and 36. Sections 32 and 34 are constructed similarly. Consequently, it will be sufficient to describe section 32. The structure of section 36 is not the subject matter of the invention. With reference to FIGS. 2-4, section 32 has a lower member 38, an upper member 40, and a plurality of braces 42 extending between them. A critical feature of the present invention is that lower member 38 is a cylindrical tube. A critical feature of this invention is that upper member 40 has a first wall 44 parallel to the plane of boom 28 and a second wall 46 which is orthogonal to first wall 44. Preferably, upper member 40 is a square tube. The cylindrical tube of lower member 38 is particularly resistant to torsional bending, while the walls of upper member 40 are more resistant to up/down and forward/rearward bending. The two different configurations with respect to lower and upper members 38, 40 are an efficient way to achieve a relatively strong boom, while keeping the number of the parts low and the weight of the beam relatively low.

A first bar 48 is attached with brackets 50 to be parallel to and just forward of lower member 38. A second bar 52 attached with brackets 54 is provided at a similar location at a rear of boom 28 (see FIG. 1, particularly with respect to boom 30). A rigid delivery tube (wet boom) 56 is attached with brackets 58 to bar 52 in a location upwardly from bar 52. Chemical dispensing nozzles (not shown) attached to the wet boom provide an injection or dispensing mechanism for appropriate chemical.

Second bar 52 is a protective bar for the wet boom 56. First bar 48 also provides a protective function and is available for attaching various other accessories.

The cylindrical tube of lower member 38 has an outside diameter which is greater than the greatest width of the square tube of upper member 40. Brace 42 is preferably solid and is larger at the bottom and narrows at the top where it attaches to upper member 40. At the bottom, brace 42 matches with the upper semi-cylindrical shape of lower member 38. Brace 42 can further attach to first and second bars 48, 52, but it does not necessarily do so.

It is understood that lower and upper members 38, 40 and braces 42 are the essential elements of boom sections 32 and 34 and that other elements disclosed are peripheral to the structure although clearly helpful to providing the chemical dispensing function of the sprayer implement.

FIG. 3 shows a plan view of boom 32. FIG. 4 shows a cross-sectional view taken along line 4-4. It is noted that centerline 60 is common to first, second, and third centerlines of the cylindrical tube of lower member 38, the square tube of upper member 40, and braces 42. Thus, the first, second, and third centerlines form a plane. The plane of boom 14 when in an operational configuration with respect to implement 10, is substantially perpendicular to the ground.

Upper member 40 is increasingly nearer to lower member 38 as boom section 32 extends increasingly farther from main body 12. This is similar in the case of boom sections 34 and 36. In this way, boom 14 is much stronger near the attachment to the main body than it is near its ends.

FIG. 5 shows a plan view of boom section 34. FIG. 6 shows a cross-sectional view of boom section 34 as taken along line 6-6 of FIG. 5.

Figure 7:
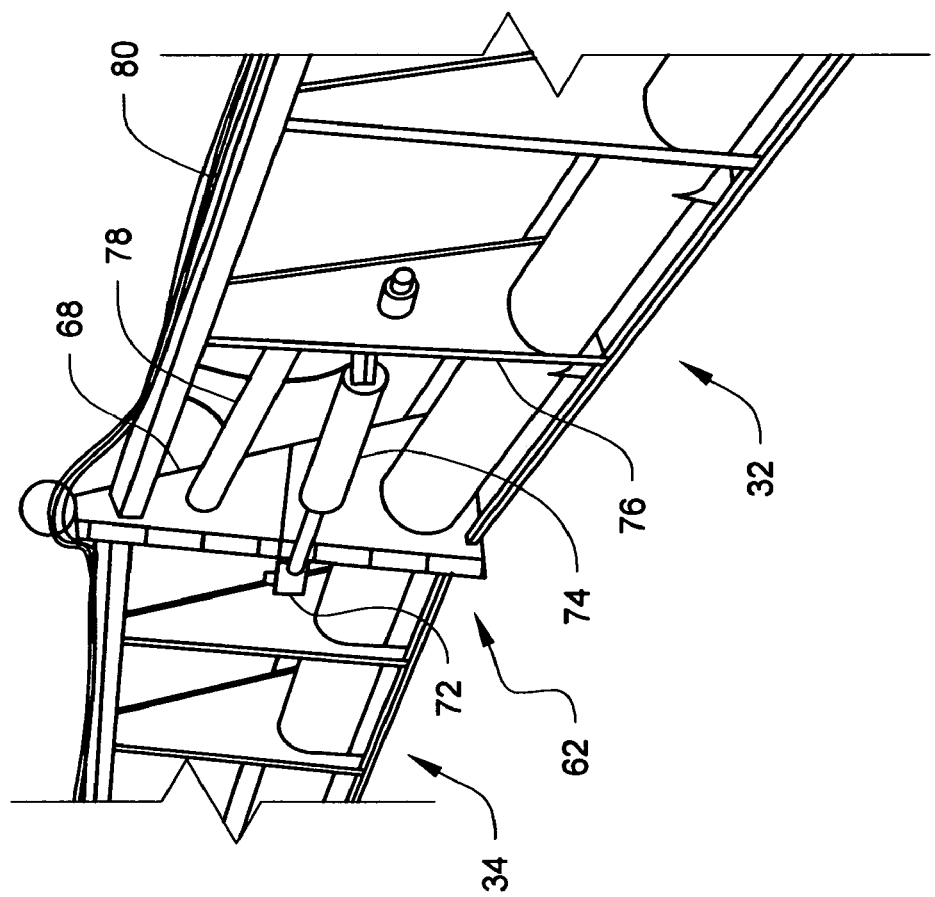
FIG. 7 is a larger view in perspective of a hinge between the two boom sections of FIGS. 3-6.

Hinge 62 between boom sections 32 and 34 is shown in FIG. 7. Hinge 62 is a simple, wing-type hinge similar to a kind commonly used on doors of buildings. As shown in FIGS. 3 and 5 the mating ends of boom sections 32 and 34 have pin engaging portions interlaced so that they mate. That is, boom section 32 has first pin engaging portions 64, while boom section 34 has a second pin engaging portions 66. A pin (not shown) is passed through all of them so that the hinge is held together as shown in FIG. 7. The trailing end brace 68 of boom section 32 forms one wing of the hinge and the leading end brace 70 (see FIG. 1) forms the other wing of the hinge. A linkage or extension member 72 extends rearwardly from end brace 70. Hydraulic cylinder 74 extends between extension member 72 and attachment brace 76. Attachment brace 76 is the next adjacent brace relative to trailing end brace 68 of boom section 32. A stiffener rod 78 extends between trailing end brace 68 and attachment brace 76.

Flexible hydraulic lines and chemical lines 80 are routed and appropriately fastened to upper member 40 of boom sections 32 and 34 and are connected as appropriate to hydraulic cylinders and the wet boom as needed and are conventionally controlled.

In use, implement 10 is moved by a powered vehicle, such as a tractor, or may be self propelled. Boom 14 is folded when driven to and from a field. Just prior to use in a field, boom 14 is unfolded. In this regard, the hydraulic control system is used conventionally. The chemical dispensing system is controlled conventionally and implement 10 is moved down a field in a usual fashion to fertilize or accomplish other appropriate agricultural purpose.

During the folding and unfolding of boom 14, boom 36 folds rearwardly, while boom 34 folds forwardly. As boom 36 folds rearwardly, it places a clockwise torsional stress on boom section 32. As boom section 34 folds forwardly, it places a counter clockwise torsional stress on boom section 32. As discussed previously, the cylindrical tube of lower member 38 effectively resists the torsional stress and keeps the boom sections planar. Likewise, when the boom 14 is fully extended, boom section 36 puts a downward bending moment on boom sections 34 and 32. Upper member 40 effectively resists the bending moment and keeps boom 14 from bending.

It is understood that the above embodiment discloses the present invention. It is further understood, however, that there are alternatives and equivalents which are also within the scope of the present invention and thus are within the meaning of the appended claims.

The invention claimed is:

1. An agricultural sprayer implement comprising:
a wheeled main body;
a cantilevered boom extending from the wheeled main body to a cantilevered end, the cantilevered boom including a torsion resistant section extending between a proximal end and a distal end, a hinge including a first wing and a second wing, and an end section extending between a proximal end and the cantilevered end; the second wing of the hinge formed by a leading end brace of the end section adjacent to the proximal end of the end section; the first wing of the hinge formed by a trailing end brace of the torsion resistant section adjacent to the distal end of the torsion resistant section; the torsion resistant section including an upper member and a lower member terminating at the trailing end brace, the torsion resistant section further including a plurality of braces extending between the upper member and the lower member, the upper member positioned increasingly nearer to the lower member as the torsion resistant section extends from the proximal end to the distal end of the torsion resistant section, the lower member of the torsion resistant section including a non-dispensing cylindrical tube, the non-dispensing cylindrical tube and the upper member being generally centered along a common vertical plane of the cantilevered boom, and the non-dispensing cylindrical tube having an outside diameter greater than a maximum width of a transverse cross-sectional shape of the upper member; and
a dispensing tube carried by the cantilevered boom for dispensing chemicals;
wherein the cantilevered boom is moved from an extended orientation to a folded orientation by pivoting the end section relative to the torsion resistant section at the hinge between the torsion resistant section and the end section;
wherein a torsional load is applied at the trailing end brace of the torsion resistant section by the end section when the end section is pivoted relative to the torsion resistant section to move the cantilevered boom from the extended orientation to the folded orientation;
wherein at least a portion of the torsional load is carried by the non-dispensing cylindrical tube of the torsion resistant section; and
wherein the end section does not include the non-dispensing cylindrical tube centered along the common vertical plane of the cantilevered boom.

2. The agricultural sprayer implement of claim 1, wherein the end section has a construction that is less torsion resistant than the torsion resistant section.

3. The agricultural sprayer implement of claim 1, wherein the upper member has a first wall that is parallel to the common vertical plane and a second wall that is orthogonal to the first wall.

4. The agricultural sprayer implement of claim 3, wherein the upper member has a square cross-sectional shape.

5. The agricultural sprayer implement of claim 1, wherein a sole function of the non-dispensing cylindrical tube is to provide structural support to the cantilevered boom and boom attachments.

6. The agricultural sprayer implement of claim 1, wherein the torsion resistant section further includes a first bar and a second bar extending between the proximal and the distal ends of the torsion resistant section, wherein the first bar and the second bar are positioned at a lower extremity of the torsion resistant section on opposite sides of the common vertical plane of the cantilevered boom.

7. The agricultural sprayer implement of claim 6, wherein the plurality of braces extends to the first and the second bars.

8. The agricultural sprayer implement of claim 1, further comprising a hydraulic cylinder adapted to move the cantilevered boom from the extended orientation to the folded orientation.

9. The agricultural sprayer implement of claim 2, further comprising a hydraulic cylinder adapted to move the cantilevered boom from the extended orientation to the folded orientation.

10. The agricultural sprayer implement of claim 3, further comprising a hydraulic cylinder adapted to move the cantilevered boom from the extended orientation to the folded orientation.

11. The agricultural sprayer implement of claim 4, further comprising a hydraulic cylinder adapted to move the cantilevered boom from the extended orientation to the folded orientation.

12. The agricultural sprayer implement of claim 5, further comprising a hydraulic cylinder adapted to move the cantilevered boom from the extended orientation to the folded orientation.

13. The agricultural sprayer implement of claim 1, wherein the plurality of braces that extend between the upper member and the lower member define a first, a second, and a third centerline that define the common vertical plane of the cantilevered boom.

14. The agricultural sprayer implement of claim 1, wherein the plurality of braces are each larger at the bottom and narrower at the top, the bottom matching an upper semi-cylindrical shape of said non-dispensing cylindrical tube and the top matching the upper member.

15. The agricultural sprayer implement of claim 13, wherein the plurality of braces are each larger at the bottom and narrower at the top, the bottom matching an upper semi-cylindrical shape of said non-dispensing cylindrical tube and the top matching the upper member.

16. The agricultural sprayer implement of claim 1, wherein the plurality of braces are attached to the upper member and to the non-dispensing cylindrical tube to capture the resistance to torsional stress of the non-dispensing cylindrical tube while increasing resistance to bending in up/down direction.

17. The agricultural sprayer implement of claim 1, wherein the function of the non-dispensing cylindrical tube consists essentially of providing resistance to torsional load when the end section is pivoted relative to the torsion resistant section to move the cantilevered boom from the extended orientation to the folded orientations.

18. The agricultural sprayer implement of claim 1, wherein the upper member and the plurality of braces provide additional resistance to bending in up/down direction or a forward/reverse direction.

19. The agricultural sprayer implement of claim 1, wherein the upper member, the plurality of braces, the non-dispensing cylindrical tube, the first bar, and the second bar provide a strong three dimensional cantilevered boom.

20. The agricultural sprayer implement of claim 2, wherein the torsion resistant section further includes a first bar and a second bar extending between the proximal and the distal ends of the torsion resistant section, wherein the first bar and the second bar are positioned at a lower extremity of the torsion resistant section on opposite sides of the common vertical plane of the cantilevered boom.

* * * * *